(12) United States Patent
Ota et al.

(10) Patent No.: US 7,283,328 B2
(45) Date of Patent: Oct. 16, 2007

(54) THIN-FILM MAGNETIC HEAD, HEAD GIMBAL ASSEMBLY WITH THIN-FILM MAGNETIC HEAD, MAGNETIC DISK DRIVE APPARATUS WITH HEAD GIMBAL ASSEMBLY, METHOD FOR DESIGNING THIN-FILM MAGNETIC HEAD AND MANUFACTURING METHOD OF THIN-FILM MAGNETIC HEAD

(75) Inventors: Norikazu Ota, Tokyo (JP); Kenji Inage, Tokyo (JP); Taro Oike, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 410 days.

(21) Appl. No.: 11/113,973

(22) Filed: Apr. 26, 2005

(65) Prior Publication Data

US 2005/0254171 A1 Nov. 17, 2005

(30) Foreign Application Priority Data

May 14, 2004 (JP) ............................. 2004-144932

(51) Int. Cl.
G11B 21/02 (2006.01)
G11B 5/56 (2006.01)
G11B 5/10 (2006.01)

(52) U.S. Cl. .................. 360/128; 360/294.7; 360/126; 360/125; 360/324

(58) Field of Classification Search ................ 360/128, 360/126, 127, 125, 294.7
See application file for complete search history.

(56) References Cited

U.S. PATENT DOCUMENTS 5,991,113 A 11/1999 Meyer et al.
6,963,464 B2 * 11/2005 Xu et al. ....................... 360/75
6,992,865 B2 * 1/2006 Thurn et al. ............. 360/294.7
7,035,046 B1 * 4/2006 Young et al. ................ 360/126
7,064,930 B2 * 6/2006 Serpe et al. ............. 360/236.5
7,092,193 B1 * 8/2006 McKenzie et al. ............ 360/75

(Continued)

FOREIGN PATENT DOCUMENTS

JP 2001-236614 A 8/2001

(Continued)

OTHER PUBLICATIONS

Japanese Office Action dated Jun. 6, 2006.

*Primary Examiner*—Wayne Young
*Assistant Examiner*—Matthew G. Kayrish
(74) *Attorney, Agent, or Firm*—Frommer Lawrence & Haug LLP

(57) ABSTRACT

A thin-film magnetic head includes at least one inductive write head element and at least one read magnetic head element, capable of controlling a spacing between a magnetic recording medium and the at least one magnetic read head element by heating. A gain SG (nm/° C.) of the spacing is greater than a spacing gain threshold $SG_{THLD}$ (nm/° C.) defined by the following expression:

$$SG_{LIMT} = A*dPTP + B$$

$A = 1.4642E{-}02*\exp(-6.6769E{-}05*LRD_{MF})$
$B = 4.9602E{-}01*\exp(-2.0423E{-}03*LRD_{MF})$ where dPTP represents an amount of change in protrusion (nm) of a top end of the at least one inductive write head element and/or the at least one read magnetic head element by heating, and $LRD_{MF}$ represents a line recording density (kFCI) at a frequency half of the maximum recording frequency.

14 Claims, 10 Drawing Sheets

U.S. PATENT DOCUMENTS

| | | | |
|---|---|---|---|
| 7,164,555 B2* | 1/2007 | Kato et al. | 360/128 |
| 2002/0097517 A1* | 7/2002 | Bonin et al. | 360/75 |
| 2003/0099054 A1* | 5/2003 | Kamijima | 360/59 |
| 2003/0174430 A1* | 9/2003 | Takahashi et al. | 360/75 |

FOREIGN PATENT DOCUMENTS

| | | |
|---|---|---|
| JP | 2002-280635 A | 9/2002 |
| JP | 2002-324306 A | 11/2002 |

* cited by examiner

THIN-FILM MAGNETIC HEAD, HEAD GIMBAL ASSEMBLY WITH THIN-FILM MAGNETIC HEAD, MAGNETIC DISK DRIVE APPARATUS WITH HEAD GIMBAL ASSEMBLY, METHOD FOR DESIGNING THIN-FILM MAGNETIC HEAD AND MANUFACTURING METHOD OF THIN-FILM MAGNETIC HEAD

PRIORITY CLAIM

This application claims priority from Japanese patent application No. 2004-144932, filed on May 14, 2004, which is incorporated herein by reference.

BACKGROUND OF THE INVENTION

1. Field of the Invention

The present invention relates to a thin-film magnetic head, a head gimbal assembly (HGA) with a thin-film magnetic head, a magnetic disk drive apparatus with the HGA, a method for designing a thin-film magnetic head, and a manufacturing method of a thin-film magnetic head.

2. Description of the Related Art

In a magnetic disk drive apparatus, one or more thin-film magnetic heads write signals into and read signals from one ore more magnetic disk rotated by a spindle motor. Each thin-film magnetic head has a slider as a main body fixed at a top end section of a suspension of an HGA, and has an inductive write head element and a magnetoresistive effect (MR) read head element formed on this slider. When writing or reading, the thin-film magnetic head is driven to a desired position on the magnetic disk by an arm capable of swinging.

When writing or reading signals, the thin-film magnetic head aerodynamically flies with keeping a predetermined magnetic spacing above the surface of the rotating magnetic disk. In this flying state, the thin-film magnetic head performs writing of signals to the magnetic disk using magnetic field generated from the inductive write head element, and performs reading of signals by sensing a magnetic field from the magnetic disk using the MR read head element.

Recently, a track width of a thin-film magnetic head becomes narrower to satisfy the requirements for increasing data storage capacities and densities of a magnetic disk drive apparatus. If the track width becomes narrow, writing ability of the magnetic write head element and also reading ability of the magnetic read head element decline. On the other hand, due to the recent increase in recording densities, recording bits on the written magnetic disk become very small. Thus, it is required for the magnetic write head element and the MR read head element to have much higher performance.

In order to solve such problems of the writing and/or reading performance, recent magnetic disk drive apparatus tends to have a smaller magnetic spacing. That is because, as smaller the spacing becomes, the signal magnetic field from the magnetic disk received in the thin-film magnetic head becomes stronger. Therefore, the magnetic disk drive apparatus is designed such that the magnetic spacing between the thin-film magnetic head and the magnetic disk surface becomes very small to satisfy today's increasing recording density.

However, when writing, Joule heat caused by a write signal current generates from a coil layer in the inductive write head element, and moreover, heat caused by an eddy current loss will be generated in upper and lower pole layers in the inductive write head element. This generated heat is accumulated inside of the magnetic head, and thus an overcoat layer or an insulation film expands thermally, to lead to a TPTP (Thermal Pole Tip Protrusion) phenomenon wherein the inductive write head element and the MR read head element protrude toward the magnetic disk surface. In this case, if a designed value of the magnetic spacing is very small, the protruded part of the MR read head element may contact the surface of the magnetic disk. This may lead to frictional heat causing change in the electric resistance value of the MR read head element to produce an abnormal read out signal or thermal asperity.

In order to avoid such thermal asperity, several methods for controlling magnetic spacing have been proposed. For example, U.S. Pat. No. 5,991,113 discloses a slider having a transducer or a magnetic head element, and a heater formed, adjacent to the transducer, in the slider body or between the slider body and the transducer. The heater is heated by applying current there through, and the transducer is protruded due to the difference in expansion coefficients between a transducer-formed region including a protection layer and the slider body so as to control the magnetic spacing.

US patent publication No. 2003/174430 discloses a thin-film magnetic head structure with a read head element, a write head element and a thermally expansive element for bringing the read head element and the write head element close to a magnetic disk surface when current flow a heater. In this structure, the heater and the thermally expansive element are arranged in a pair. When the heater is energized, the thermally expansive element arranged in a pair expands to distort an overcoat layer of the magnetic head so that the read head element and the write head element are brought close to the magnetic disk surface.

US patent publication No. 2003/99054 discloses a thin-film magnetic head with a heating means arranged at the opposite of an air bearing surface (ABS) of a magnetic head element. When the magnetic head element is in operation, the heating means is heated so that the magnetic head element protrudes toward the ABS direction to adjust a magnetic spacing.

However, in such thin-film magnetic heads provided with the pair of heater and thermally expansive element or with the heating means, or a thin-film magnetic head provided with no heater but thermally expanded by the heat of its inductive write head element, because the generated heat and stress are applied to the MR read head element, shortening in lifetime, or change in characteristic or instability caused by the stress change under high temperature sometimes occur.

In the conventional methods for controlling the magnetic spacing of such thin-film magnetic heads, there has been almost no measure to maintain the temperature increase of the MR read head element.

BRIEF SUMMARY OF THE INVENTION

It is therefore an object of the present invention to provide a thin-film magnetic head, an HGA with the thin-film magnetic head, a magnetic disk drive apparatus with the HGA, a method for designing a thin-film magnetic head and a manufacturing method of thin-film magnetic head, whereby it is possible to suppress the temperature increase of an MR read head element when controlling a magnetic spacing taking advantage of the TPTP phenomenon.

According to the present invention, a thin-film magnetic head includes at least one inductive write head element and at least one read magnetic head element, capable of controlling a spacing between a magnetic recording medium and the at least one magnetic read head element by heating. A gain SG (nm/° C.) of the spacing is greater than a spacing gain threshold $SG_{THLD}$ (nm/° C.) defined by the following expression:

$$SG_{LIMT}=A*dPTP+B$$

$A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of the at least one inductive write head element and/or the at least one read magnetic head element by heating, and $LRD_{MF}$ represents a line recording density (kFCI) at a frequency half of the maximum recording frequency.

When a total output gain $TOUTG_{TAA}$ of the magnetic read head element is assumed as $TOUTG_{TAA}=OUTG_{TAA}*OUTL_{TAA}$, by taking into account an output gain $OUTG_{TAA}$ of the magnetic read head element due to the reduction of the spacing by thermal expansion and an output loss $OUTL_{TAA}$ due to the drop of a sense current of the magnetic read head element to suppress its temperature, if the spacing gain SG (nm/° C.) indicating change in spacing due to temperature increase of the magnetic read head element is determined to be greater than the abovementioned spacing gain threshold $SG_{THLD}$ (nm/° C.), effective magnetic spacing control and thus improvement of the output characteristic can be expected while suppressing the temperature increase of the MR read head element to prevent shortening of lifetime and characteristic change due to possible stress change under high temperature.

It is preferred that the thin-film magnetic head further includes an independent heating element other than a coil conductor of the at least one inductive write head element, and that the spacing is controlled by heating of the heating element.

It is also preferred that the spacing is controlled only by heating of a coil conductor of the at least one inductive write head element.

It is further preferred that the at least one read magnetic head element includes a giant magnetoresistive effect (GMR) read head element with a current in plane (CIP) structure or a current perpendicular to plane (CPP) structure, or a tunnel magnetoresistive effect (TMR) read head element.

According to the present invention, an HGA having the above-mentioned thin-film magnetic head and a support mechanism supporting the thin-film magnetic head, and a disk drive apparatus having at least one such HGA is further provided.

According to the present invention, a method for designing a thin-film magnetic head including at least one inductive write head element and at least one read magnetic head element, a spacing between a magnetic recording medium and at least one magnetic read head element being controllable by heating is provided. The method includes a step of determining a gain SG (nm/° C.) of the spacing to be greater than a spacing gain threshold $SG_{THLD}$ (nm/° C.) defined by the following expression:

$$SG_{LIMT}=A*dPTP+B$$

$A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of the at least one inductive write head element and/or the at least one read magnetic head element by heating, and $LRD_{MF}$ represents a line recording density (kFCI) at a frequency half of the maximum recording frequency is further provided. The present invention also provides a manufacturing method of the abovementioned thin-film magnetic head, which uses this designing method.

Further objects and advantages of the present invention will be apparent from the following description of the preferred embodiments of the invention as illustrated in the accompanying drawings.

DETAILED DESCRIPTION OF THE INVENTION

Figure 1:
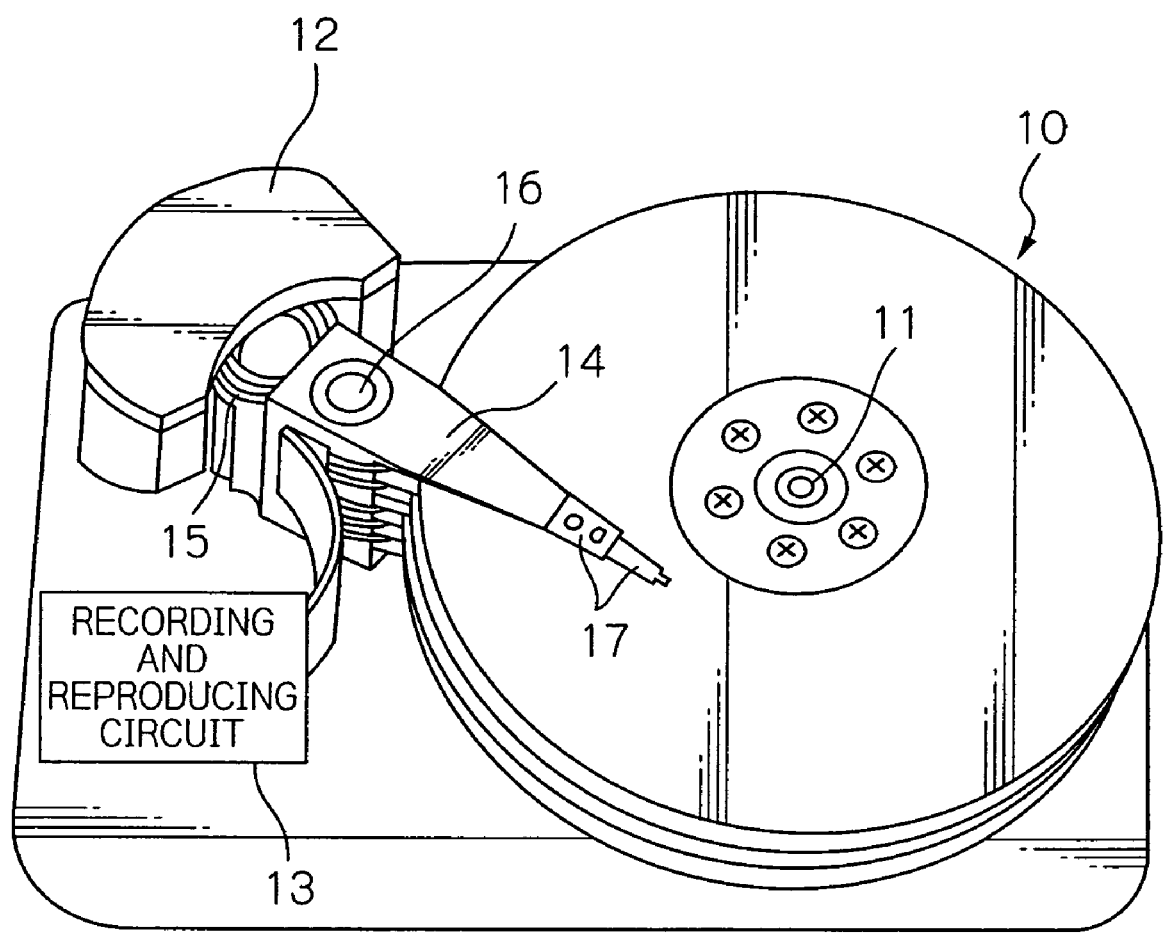
FIG. 1 shows a perspective view schematically illustrating main components of a magnetic disk drive apparatus in a preferred embodiment according to the present invention.
Figure 2:
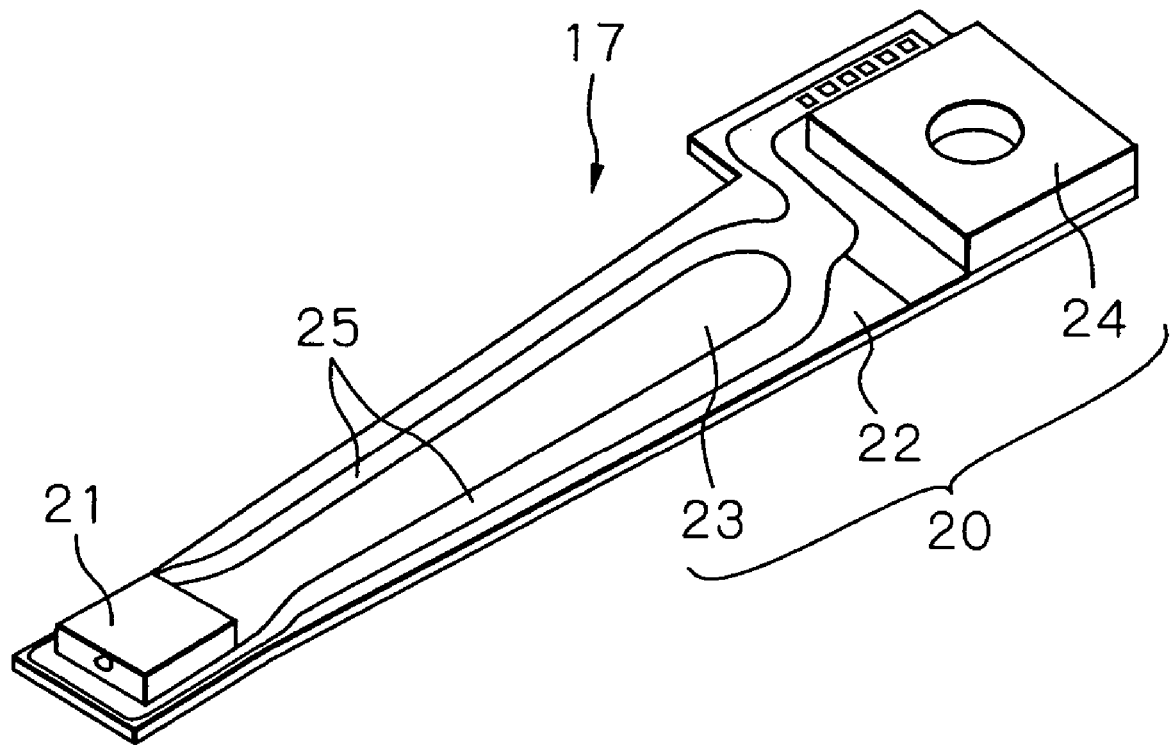
FIG. 2 shows a perspective view illustrating the whole of an HGA.
Figure 3:
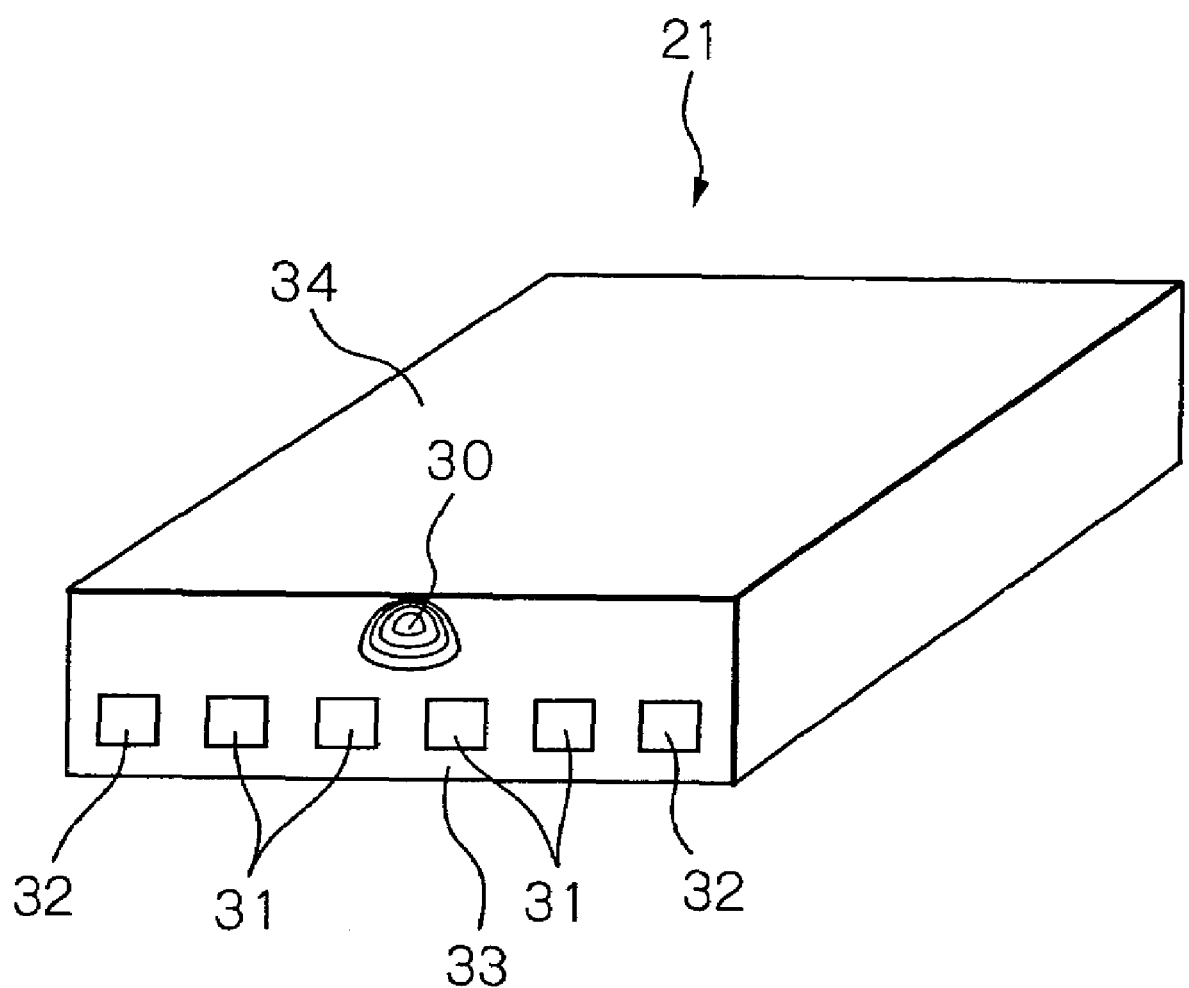
FIG. 3 shows a perspective view of a magnetic head slider provided at the top end section of the HGA.

FIG. 1 schematically illustrates main components of a magnetic disk drive apparatus in one embodiment according to the present invention, FIG. 2 shows the whole of an HGA, and FIG. 3 shows a magnetic head slider provided at the top end section of the HGA.

In FIG. 1, reference numeral 10 indicates a plurality of disks 10 rotating in operation around a rotation axis 11 of a spindle motor, 12 indicates an assembly carriage device for positioning a thin-film magnetic head formed on a magnetic head slider on a track, and 13 indicates a recording and reproducing circuit for controlling the read/write operations of a thin-film magnetic head and the heat operation, respectively.

The assembly carriage device 12 has a plurality of drive arms 14. These drive arms 14 are driven by a voice coil motor (VCM) 15 to rotate around a pivot bearing axis 16, and stacked in the direction along the axis 16. An HGA 17 is fixed at the top end section of each drive arm 14. A magnetic head slider is attached to each HGA 17 to oppose a surface of each magnetic disk 10. Although in the above-description a plurality of the magnetic disks 10, drive arms 14, HGAs 17 and magnetic head sliders are mounted in the magnetic disk drive apparatus, each of these may be single in modifications.

As shown in FIG. 2, the HGA 17 is constituted by fixing a magnetic head slider 21 having a thin-film magnetic head at the top end section of a suspension 20, and by electrically connecting one end of a wiring member 25 to signal electrodes of the magnetic head slider 21.

The suspension 20 mainly consists of a load beam 22, a resilient flexure 23 fixed and supported on the load beam 22, a base plate 24 fixed to the base end section of the load beam 22, and the wiring member 25 formed on the flexure 23. The wiring member 25 has trace conductors and connection pads electrically connected to both end of the respective trace conductors.

It is apparent that the structure of the suspension in the HGA of the present invention is not limited to aforementioned structure. Although it is not shown, a head drive IC chip may be mounted on the suspension 20.

As shown in FIG. 3, the magnetic head slider 21 in this embodiment has a thin-film magnetic head 30 including a magnetic write head element and a magnetic read head element stacked each other, four signal electrodes 31 connected to these head elements, and two drive electrodes 32 for current to be fed to a heater (not shown in FIG. 3), on its element formed surface 33. In FIG. 3, reference numeral 34 indicates an ABS of the magnetic head slider 21.

Figure 4:
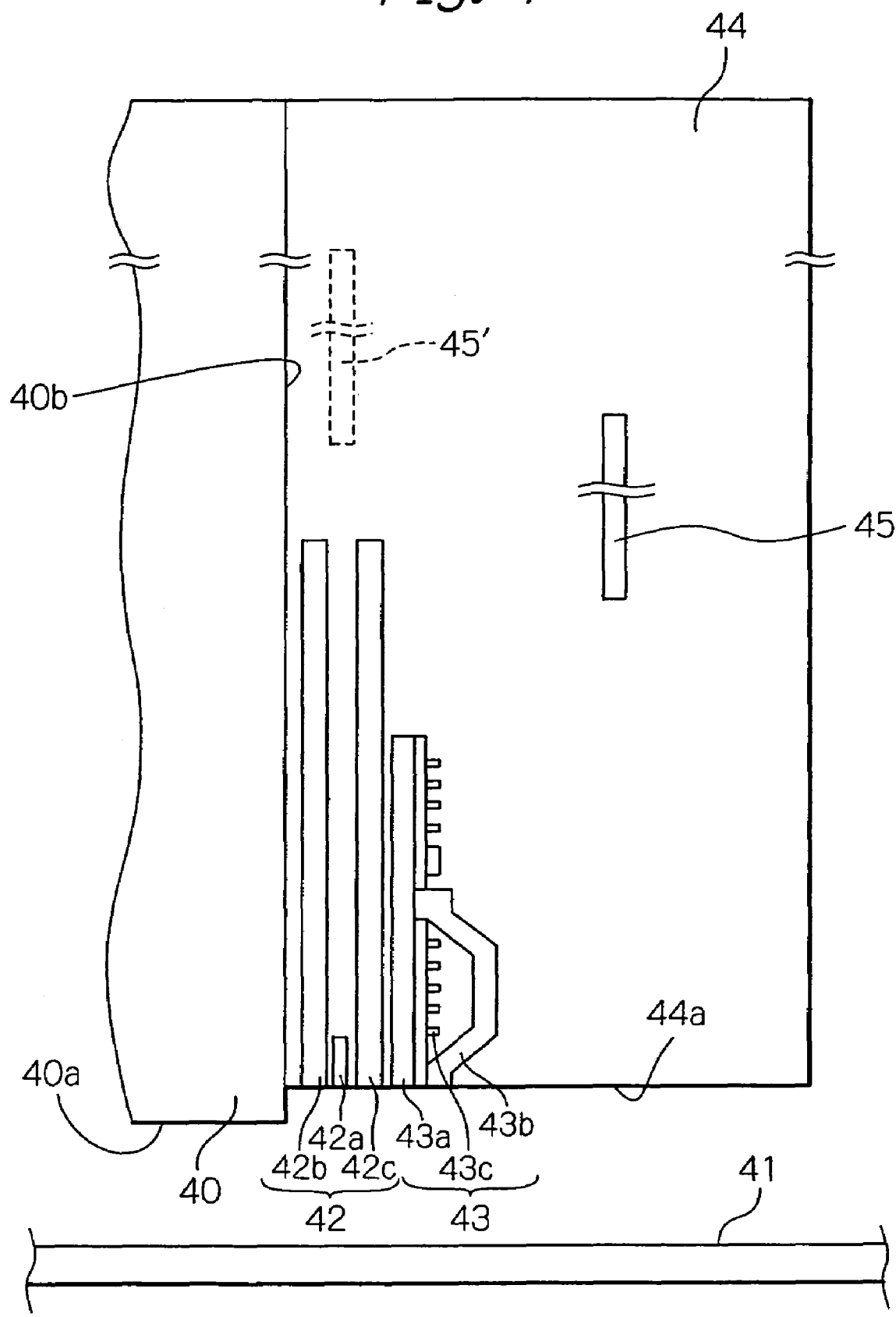
FIG. 4 shows a sectional view schematically illustrating one example of the constitution of the thin-film magnetic head in the embodiment shown in FIG. 1.

FIG. 4 schematically illustrates one example of the constitution of the thin-film magnetic head in this embodiment.

As shown in this figure, a slider body or slider substrate 40 having an ABS 40a flies with a predetermined aerodynamic space above the surface of a rotating magnetic disk 41 during the writing or reading operation. An MR read head element 42, an inductive write head element 43 and an overcoat layer 44 covering these head elements are formed on one side surface (element-formed surface) 40b of the slider body 40 when the ABS 40a of the slider body 40 is defined as its bottom surface.

The MR read head element 42 includes an MR layer 42a, a lower shield layer 42b and an upper shield layer 42c. The lower shield layer 42b and the upper shield layer 42c are arranged to sandwich the MR layer 42a. The MR layer 42a consists of a CIP-GMR multilayer, a CPP-GMR multilayer or a TMR multiplayer to sense a signal magnetic field with very high sensitivity. The lower shield layer 42b and the upper shield layer 42c are magnetic layers so as to shield possible external magnetic field that may cause noise applied to the MR layer 42a. The inductive write head element 43 includes a lower pole layer 43a, an upper pole layer 43b and a coil layer 43c. The lower pole layer 43a and the upper pole layer 43b constitute a magnetic path to converge and lead a magnetic flux generated from the coil layer 43c to the surface of the magnetic disk 41 when writing.

The end surfaces of the MR read head element 42 and the inductive write head element 43 facing the magnetic disk surface 41 constitute a pole tip recess (PTR) surface 44a. This PTR surface 44a is coated by a protection film made of for example diamond like carbon (DLC). The distance between the PTR surface in a magnetic element section and the magnetic disk surface in operation corresponds to the magnetic spacing.

In this embodiment, a heater 45 is formed in the overcoat layer 44 at a position opposite the slider body 40 with respect to the MR read head element 42 and the inductive write head element 43.

By conditioning the structure, the shape, the materials, the position and the drive scheme of the heater 45, and by conditioning the structure, the shape and the materials of the thin-film magnetic head itself, in this embodiment, it is determined that a spacing gain SG (nm/° C.) due to heating of the heater 45 becomes greater than a critical spacing gain value or a spacing gain threshold value $SG_{THLD}$ (nm/° C.) defined by the following expression:

$$SG_{LIMT} = A * dPTP + B$$

$A = 1.4642E-02 * \exp(-6.6769E-05 * LRD_{MF})$ $B = 4.9602E-01 * \exp(-2.0423E-03 * LRD_{MF})$ where dPTP represents a target amount of change in protrusion or an amount of change in spacing (nm), and $LRD_{MF}$ represents a line recording density (kFCI) at a frequency half of the maximum recording frequency.

This expression can be derived as follows.

It is assumed that a total output gain or an amount of change in output $TOUTG_{TAA}$ of the MR read head element 42 (indicated as a ratio (%) of TAA (track average amplitude)) is represented by $TOUTG_{TAA} = OUTG_{TAA} * OUTL_{TAA}$, where $OUTG_{TAA}$ is an output gain of the MR read head element due to decrease in a spacing caused by thermal expansion (indicated as a ratio (%) of TAA), and $OUTL_{TAA}$ is an output loss of the MR read head element due to drop in a sense current of the MR read head element to suppress its temperature (indicated as a ratio (%) of TAA).

The output gain $OUTG_{TAA}$ of the MR read head element due to the reduction of the spacing by thermal expansion can be obtained from the following spacing loss expression between a recording medium and a magnetic head. That is, the spacing loss is given from $Ls = 54.6 \Delta d / \lambda$ (dB), where $\Delta d$ is the amount of change in spacing (nm) in a magnetic head gap, and $\lambda$ is a recording signal wavelength (nm).

If an output of MR read head element 42 when thermally expanded is TAA1 (indicated as a ratio (%) of TAA) and an output of MR read head element 42 when not thermally expanded is TAA2 (indicated as a ratio (%) of TAA), this spacing loss Ls is expressed as $Ls = 20 \log(TAA1/TAA2)$, therefore, the expression of $20 \log(TAA1/TAA2) = 54.6 \Delta d / \lambda$ is established, and thus the output gain $OUTG_{TAA}$ can be calculated from this TAA1/TAA2.

Figure 5:
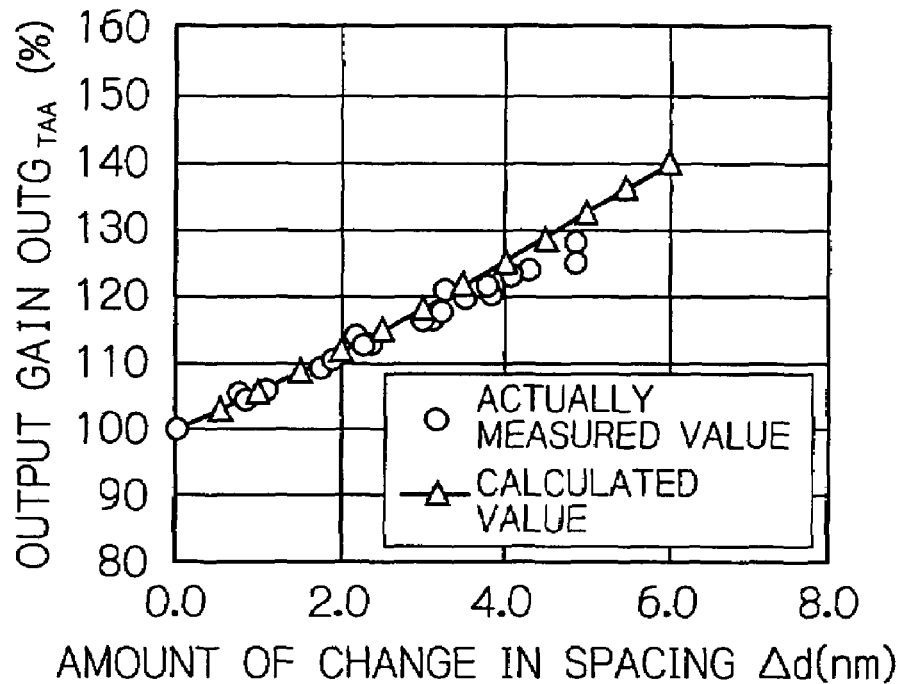
FIG. 5 shows a graph illustrating relationships between an amount of change in spacing Δd and a measured value and a calculated value of output gain $OUTG_{TAA}$.

FIG. 5 illustrates relationships between an amount of change in spacing Δd and an actually measured value of output gain $OUTG_{TAA}$ and a calculated value of output gain $OUTG_{TAA}$ using the abovementioned expression. In the actual measurement, TAA is measured by changing the flying height of the thin-film magnetic head to obtain the change in spacing. From the figure, it can be noted that the calculated value and the actually measured value are in good agreement.

Output loss $OUTL_{TAA}$ caused by dropping a sense current of the MR read head element 42 so as to suppress the temperature of this MR read head element can be obtained as follows.

Figure 6:
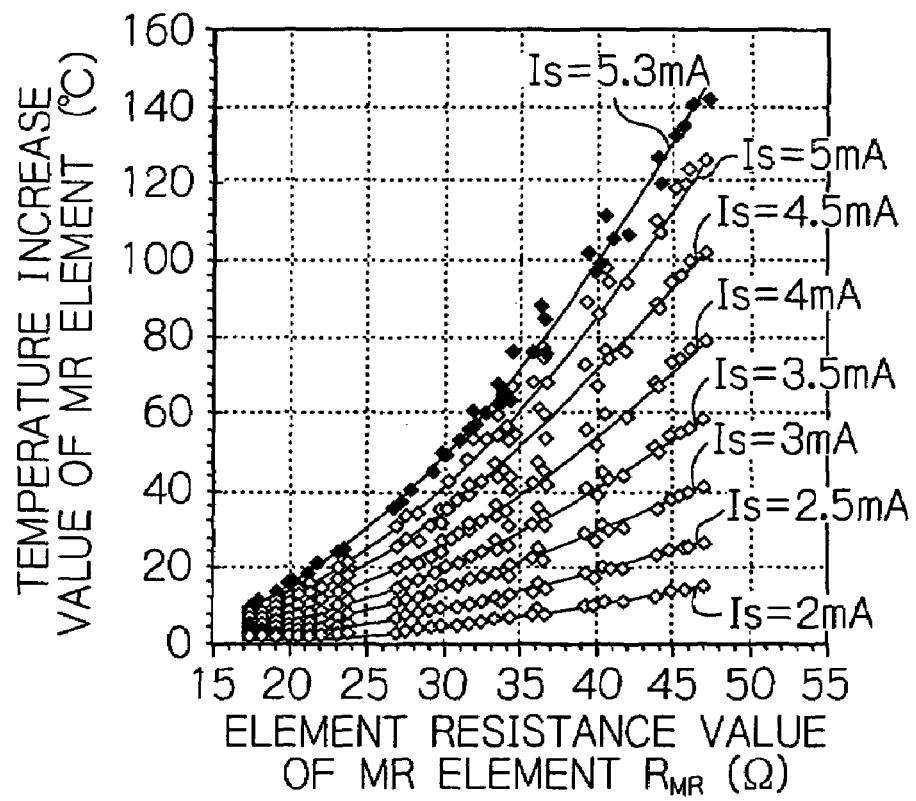
FIG. 6 shows a graph illustrating a relationship between an element resistance value and a temperature increase value of an MR read head element, using a parameter of sense current Is.
Figure 7:
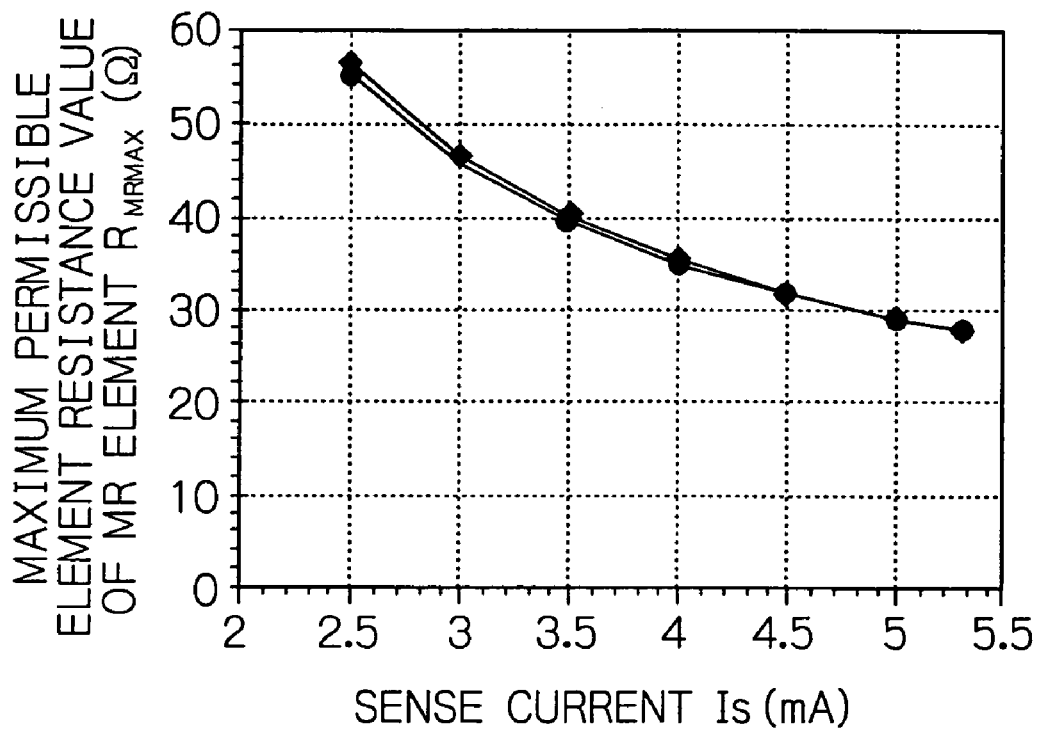
FIG. 7 shows a graph illustrating a relationship between a sense current Is and the maximum permissible element resistance value of the MR read head element.

FIG. 6 illustrates a relationship between an element resistance value of an MR read head element $R_{MR}$ and its temperature increase value, using a parameter of sense current Is, and FIG. 7 illustrates a relationship between a sense current Is of the MR read head element and its maximum permissible element resistance value $R_{MRMAX}$ for two samples.

The maximum permissible element resistance value $R_{MRMAX}$ of the MR read head element is the maximum element resistance value permissible to assure 2.5 years-lifetime of the MR read head element under a predetermined condition of 70° C. and 100% duty cycle. This value depends upon the sense current. It is required that the MR read head element has an element resistance value $R_{MR}$ equal to or less than the maximum permissible element resistance value $R_{MRMAX}$.

Figure 8:
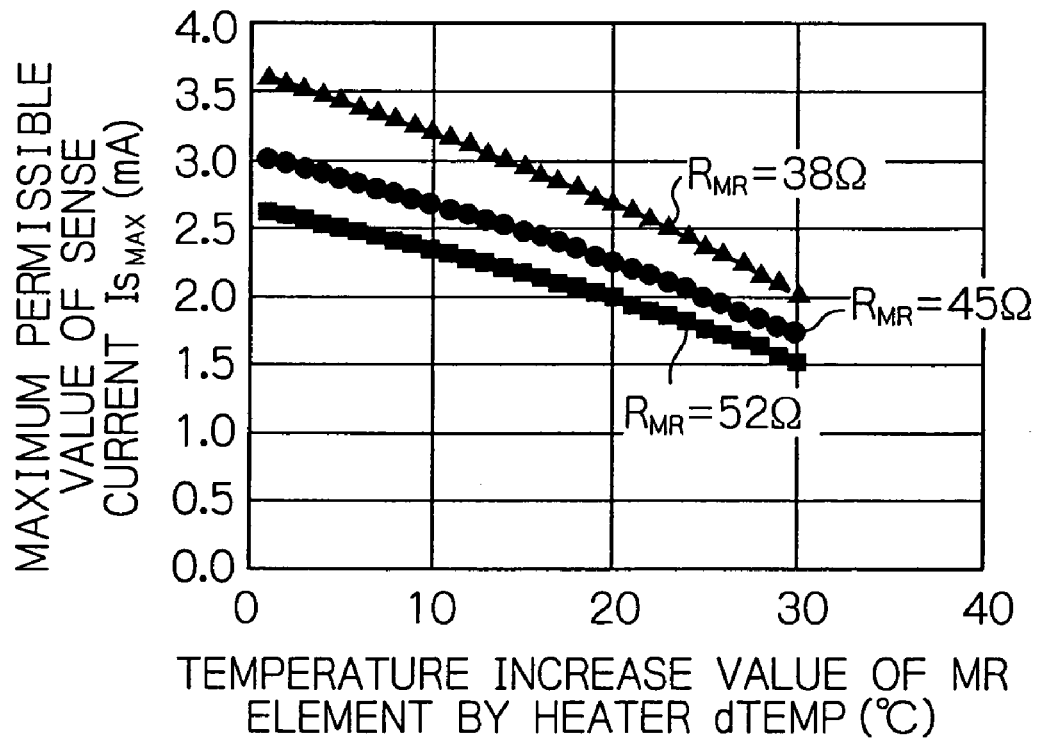
FIG. 8 shows a graph illustrating a relationship between a temperature increase value of the MR read head element dTEMP caused by heating of a heater and the maximum permissible value of the sense current $IS_{MAX}$.

FIG. 8 illustrates a relationship between a temperature increase value of the MR read head element dTEMP due to heating of the heater 45 and the maximum permissible value of the sense current $IS_{MAX}$, obtained from the relationships shown in FIGS. 6 and 7. In this figure, used is a parameter of the element resistance value of the MR read head element $R_{MR}$.

It is derived from FIG. 7 that when the element resistance value is $R_{MR}$=45 Ω, the maximum permissible value of the sense current at dTEMP=0° C. is $IS_{MAX}$=3.05 mA, and also it is derived from FIG. 6 that the maximum permissible temperature increase value of the MR read head element in this case is 39.6° C. That is, because it is not permitted to heat the MR read head element above 39.6° C., the sense current Is must be reduced so as to compensate increase in temperature of the MR read head element 42 due to heating of heater 45. This relationship of the sense current Is with respect to the temperature increase value of an MR read head element can be derived from the characteristics at the element resistance value $R_{MR}$=45 Ω in FIG. 6.

From FIG. 8, approximate expressions of $IS_{MAX}$ (y) versus dTEMP(x) become as: $y=-0.0005x^2-0.0397x+3.68$ when $R_{MR}$=38 Ω, $y=-0.0004x^2-0.0314x+3.05$ when $R_{MR}$=45 Ω, and $y=-0.0004x^2-0.0265x+2.65$ when $R_{MR}$=52 Ω.

Figure 9:
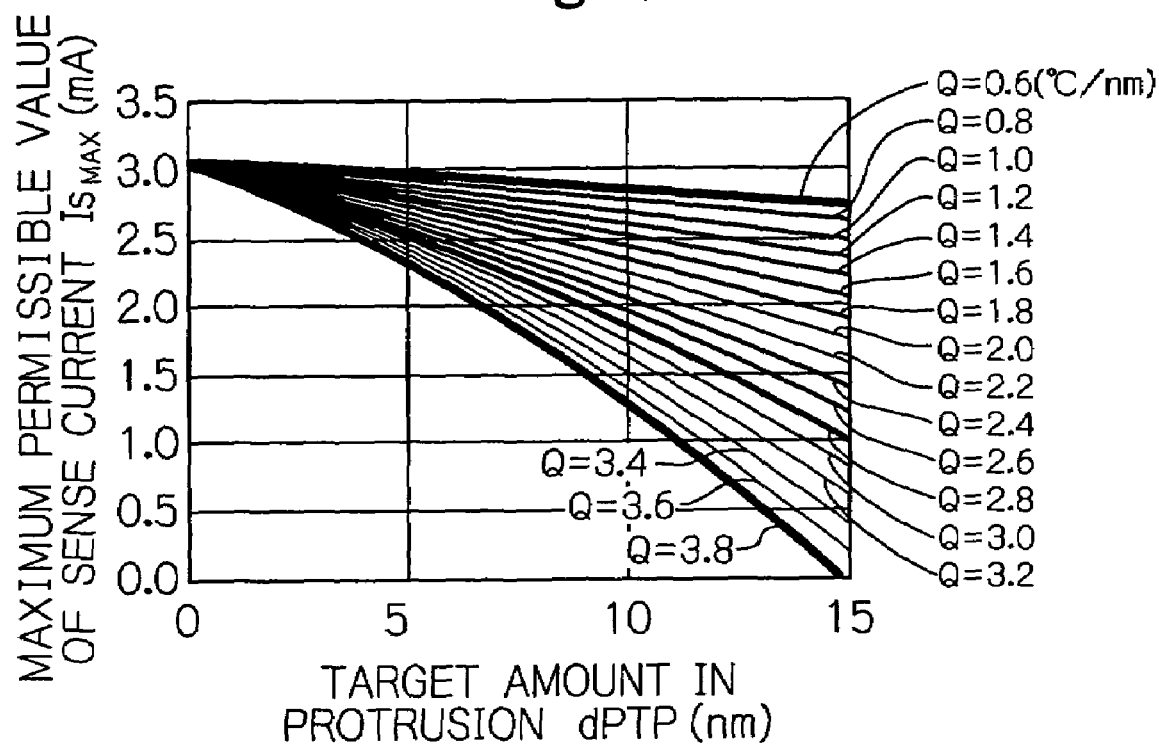
FIG. 9 shows a graph illustrating a relationship between a target amount of change in protrusion dPTP and the maximum permissible values of the sense current $Is_{MAX}$.

FIG. 9 illustrates the characteristics shown in FIG. 8 when the element resistance value is $R_{MR}$=45 Ω, using a parameter of Q=(temperature increase value of MR read head element dTEMP)/(amount of change in spacing dPTP)(° C./nm). This figure represents a target amount of change in protrusion at the top end of the head element caused by heating, that is, characteristics of the maximum permissible value of sense current $IS_{MAX}$ versus the amount of change in spacing dPTP.

The calculation was performed under the following conditions: (1) The recording is performed at a middle frequency (MF) that is half of the maximum recording frequency HF, in the outer disk part of the magnetic disk (OD) at the radius of 45.91 mm. (2) The rotation speed of the magnetic disk is 7200 rpm, the maximum recording frequency HF is 492 MHz, the middle frequency MF is 246 MHz, the line recording density is 361 kFCI, and the recording wavelength λ is 140.7 nm. (3) The maximum permissible value of the sense current is $IS_{MAX}$=3.05 mA, and the maximum permissible temperature increase value of the MR read head element in this case is 39.6° C. (4) The output of the MR read head element TAA is proportional to the change in its sense current Is, and the maximum permissible temperature increase value of the MR read head element is maintained at 39.6° C.

As will be noted from FIG. 9, under the condition that the amount of change in spacing is kept constant, when the parameter Q (=dTEMP/dPTP) increases, it is necessary to reduce the sense current Is so as to compensate the increase in temperature. As a result, when Q increases, the output loss of the MR read head element becomes greater or $OUTL_{TAA}$ value decreases.

From this output loss of the MR read head element $OUTL_{TAA}$ and the output gain of the MR read head element $OUTG_{TAA}$ due to the reduction of the spacing by thermal expansion, a total output gain $TOUTG_{TAA}$ can be calculated from $TOUTG_{TAA=OUTGTAA}*OUTL_{TAA}$. The calculated result is shown in FIG. 10.

Figure 10:
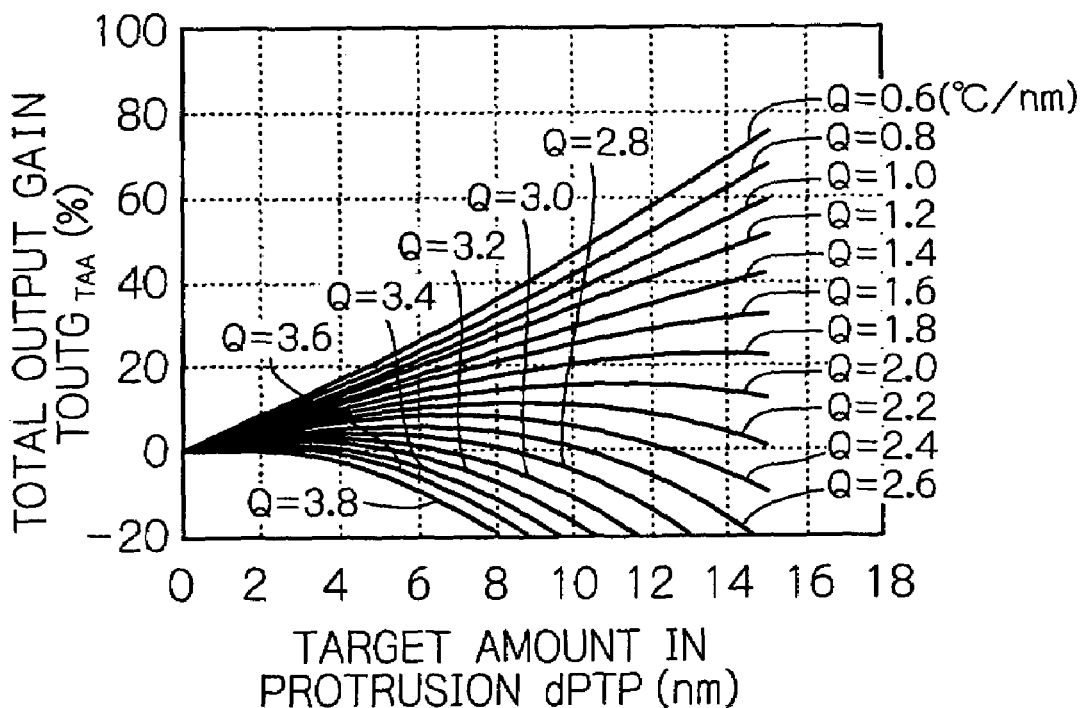
FIG. 10 shows a graph illustrating a relationship between the target amount of change in protrusion dPTP and a total output gain $TOUTG_{TAA}$.

FIG. 10 illustrates a relationship between a target amount of change in protrusion at the top end of the head element caused by heating, that is, the amount of change in spacing dPTP and a total output gain $TOUTG_{TAA}$, using Q=(temperature increase value of the MR read head element dTEMP)/(amount of change in spacing dPTP)(° C./nm) as a parameter. From this figure, it is understood that when Q increases, the total output gain TOUT decreases.

Figure 11:
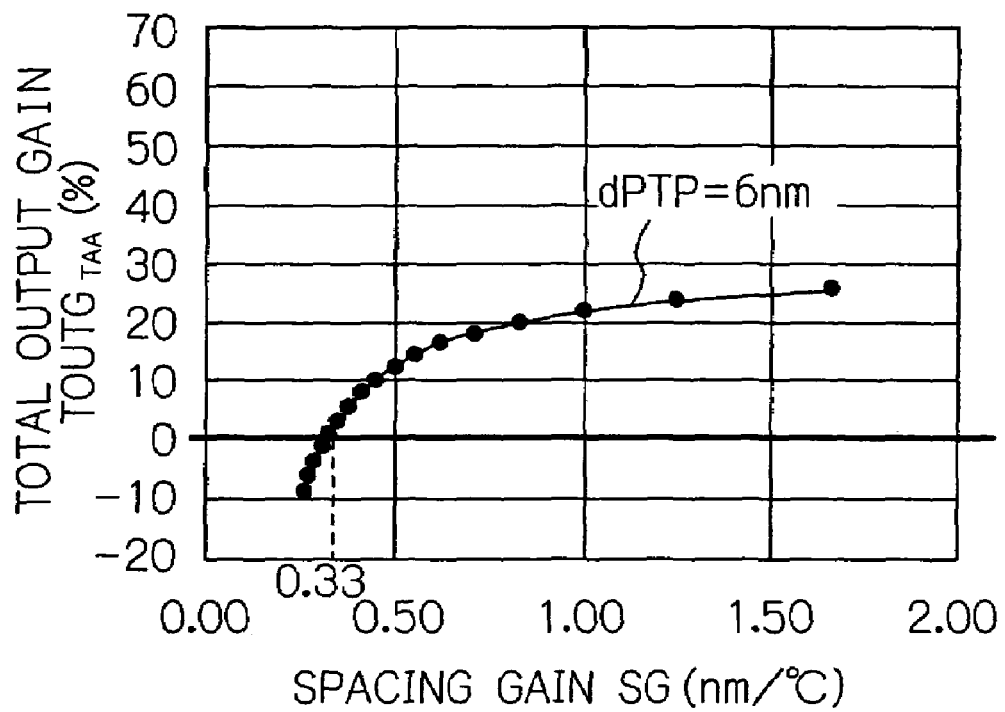
FIG. 11 shows a graph illustrating a relationship between the total output gain $TOUTG_{TAA}$ and 1/Q.

A relationship between the total output gain $TOUTG_{TAA}$ and 1/Q that is a spacing gain SG when the amount of change in spacing dPTP is 6 nm is calculated from FIG. 10, and the calculated result is shown in FIG. 11.

FIG. 11 illustrates characteristics of the total output gain $TOUTG_{TAA}$ versus 1/Q.

Because the total output gain $TOUTG_{TAA}$ must be greater than zero, 1/Q or spacing gain SG at the zero crossover point in the figure represents a spacing gain threshold $SG_{THLD}$. The spacing gain SG must be greater than this spacing gain threshold $SG_{THLD}$. From FIG. 11, the spacing gain threshold $SG_{THLD}$ when dPTP=6 nm is $SG_{THLD}$=0.33 nm/° C. Preferably, the spacing gain SG is further increased so that the total output gain $TOUTG_{TAA}$ will further increase.

Figure 12:
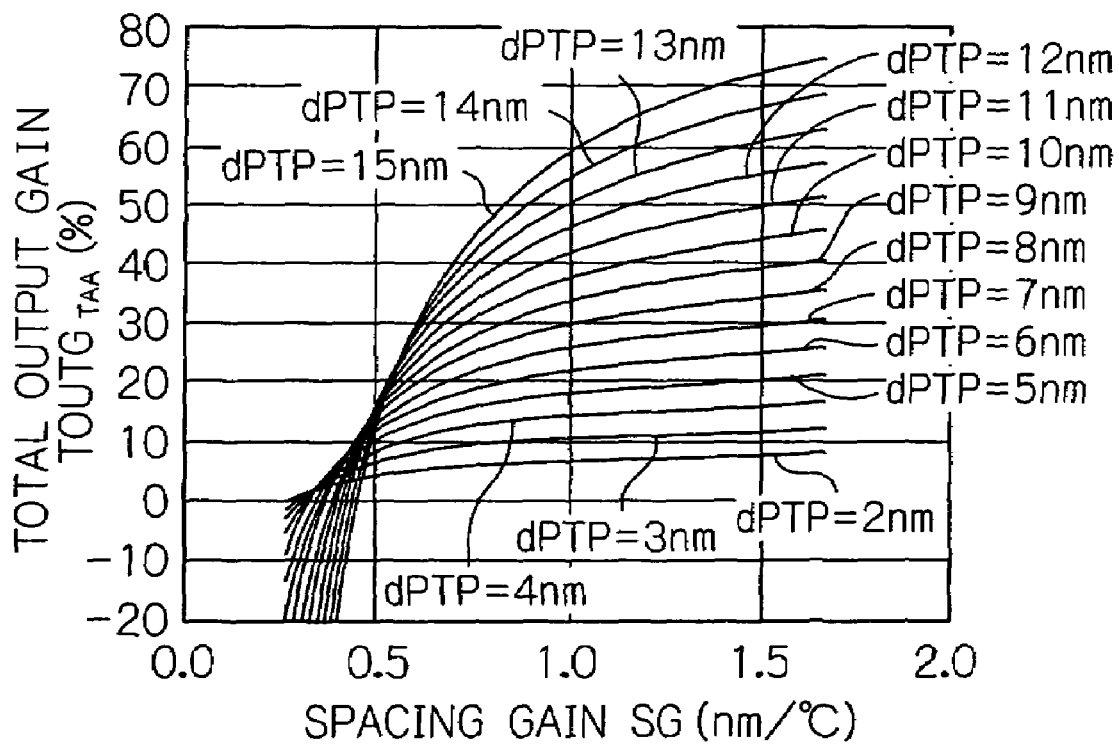
FIG. 12 shows a graph illustrating a relationship between a spacing gain SG and the total output gain $TOUTG_{TAA}$ using amounts of change in spacing dPTP as a parameter.
Figure 13:
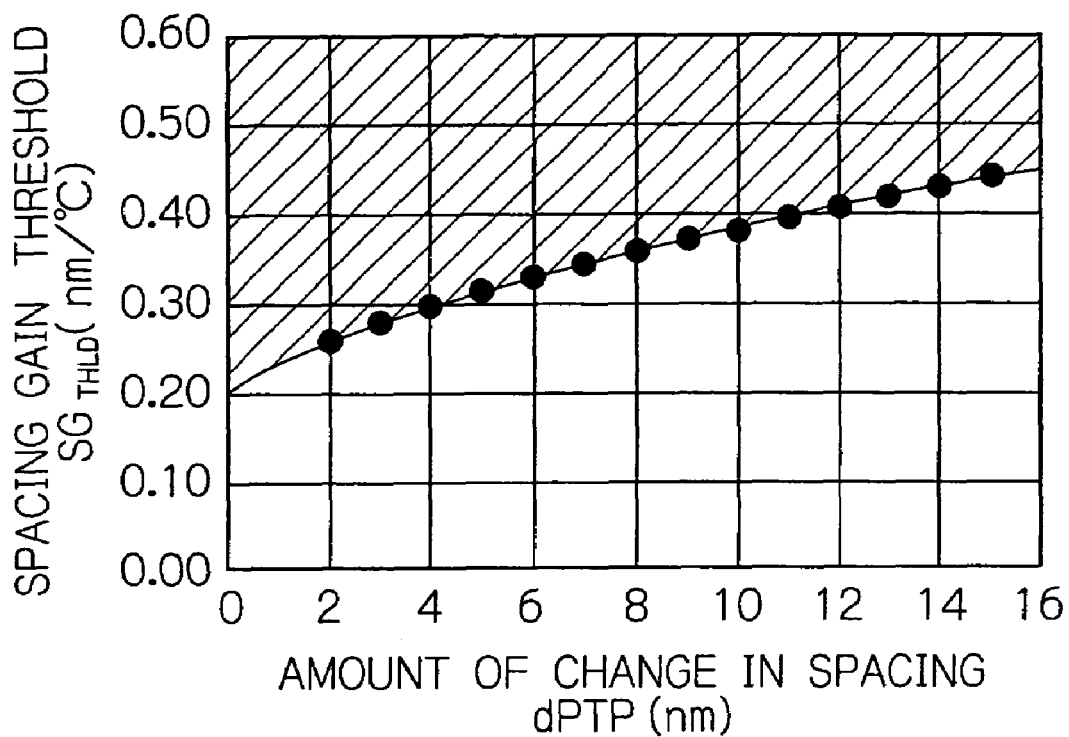
FIG. 13 shows a graph illustrating a relationship between the amount of change in spacing dPTP and a spacing gain threshold $SG_{THLD}$.

FIG. 12 illustrates a relationship between the spacing gain SG and the total output gain $TOUTG_{TAA}$ using amounts of change in spacing dPTP as a parameter, and FIG. 13 illustrates a relationship between the spacing gain threshold $SG_{THLD}$ and the amount of change in spacing dPTP. Namely, FIG. 13 indicates the spacing gain SG at zero crossover point calculated for each dPTP of FIG. 12.

The approximate expression of the characteristics shown in FIG. 13 is $y=0.0003x^2+0.0188x+0.226$. When designing a thin-film magnetic head with a heater, it is necessary that its spacing gain SG is greater than a spacing gain threshold $SG_{THLD}$, that is, the spacing gain SG is kept within the shaded area of the figure.

Figure 14:
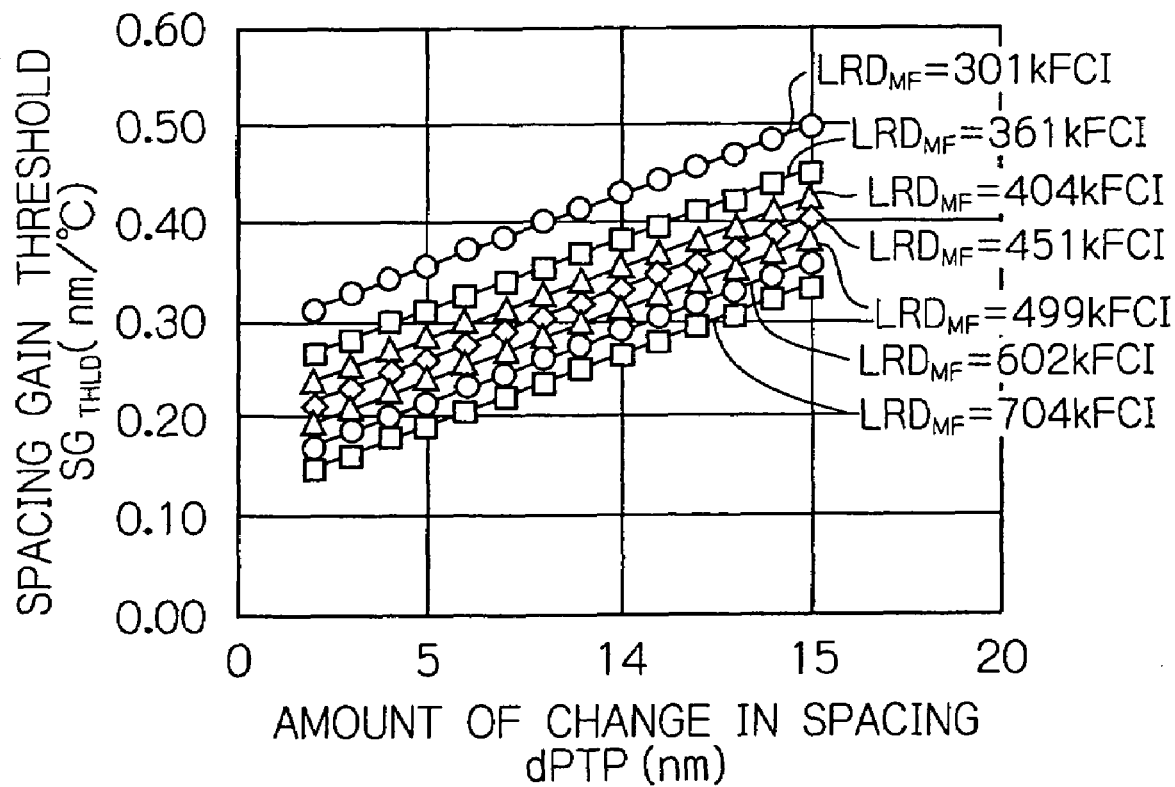
FIG. 14 shows a graph illustrating a relationship between the amount of change in spacing dPTP and the spacing gain threshold $SG_{THLD}$ using line recording density $LRD_{MF}$ as a parameter.

FIG. 14 illustrates a relationship between the amount of change in spacing dPTP and the spacing gain threshold $SG_{THLD}$ using line recording density $LRD_{MF}$ as a parameter. This characteristic of the spacing gain threshold $SG_{THLD}$ is calculated by changing line recording density $LRD_{MF}$ and therefore by changing the recording wavelength. In the figure, the approximate expression of the characteristic of the spacing gain threshold $SG_{THLD}$ at the line recording density $LRD_{MF}$=301 kFCI is y=0.0144x+0.2849, the approximate expression of the characteristic of the spacing gain threshold $SG_{THLD}$ at the line recording density $LRD_{MF}$=361 kFCI is y=0.0143x+0.2380, the approximate expression of the characteristic of the spacing gain threshold $SG_{THLD}$ at the line recording density $LRD_{MF}$=404 kFCI is y=0.0142x+0.2127, the approximate expression of the characteristic of the spacing gain threshold $SG_{THLD}$ at the line recording density $LRD_{MF}$=451 kFCI is y=0.0143x+0.1890, the approximate expression of the characteristic of the spacing gain threshold $SG_{THLD}$ at the line recording density $LRD_{MF}$=499 KFCI is y=0.0140x+0.1736, the approximate expression of the characteristic of the spacing gain threshold $SG_{THLD}$ at the line recording density $LRD_{MF}$=602 kFCI is y=0.0141x+0.1435, and the approximate expression of the characteristic of the spacing gain threshold $SG_{THLD}$ at the line recording density $LRD_{MF}$=704 kFCI is y=0.0140x+0.1231. These approximate expressions are all similar. That is, the spacing gain threshold $SG_{THLD}$ can be expressed as a linear function depending upon the line recording density $LRD_{MF}$.

Figure 15:
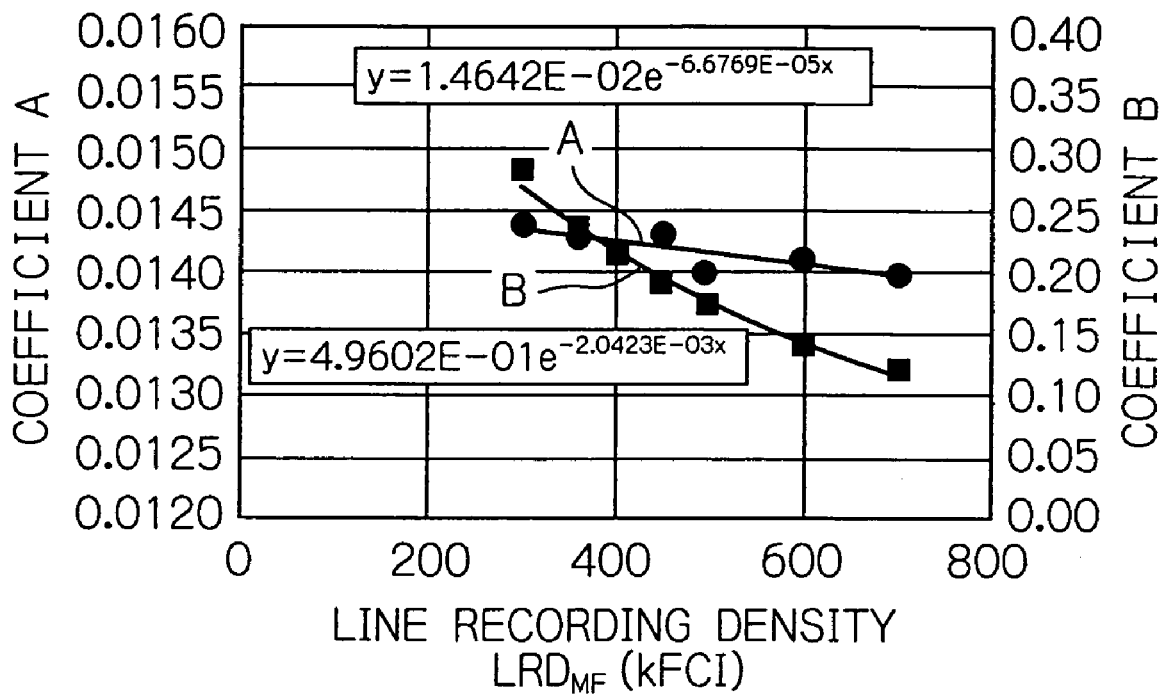
FIG. 15 shows a relationship between a line recording density $LRD_{MF}$ when a spacing gain threshold $SG_{THLD}$ is expressed as a linear function of this line recording density $LRD_{MF}$ and coefficients A and B of the linear function.

FIG. 15 illustrates a relationship between a line recording density $LRD_{MF}$ when a spacing gain threshold $SG_{THLD}$ is expressed as $SG_{LIMT}=A*dPTP+B$ that is a linear function of the line recording density $LRD_{MF}$ and coefficients A and B of the linear function.

It is noted from the figure that the coefficient A is expressed by an approximate expression of y=1.4642E-02*exp(-6.6769E-05x), and the coefficient B is expressed by an approximate expression of y=4.9602E-01*exp(-2.0423E-03x).

Therefore, the spacing gain threshold $SG_{THLD}$ can be defined by:

$$SG_{LIMT}=A*dPTP+B$$

A=1.4642E-02*exp(-6.6769E-05*$LRD_{MF}$)

B=4.9602E-01*exp(-2.0423E-03*$LRD_{MF}$).

Figure 16:
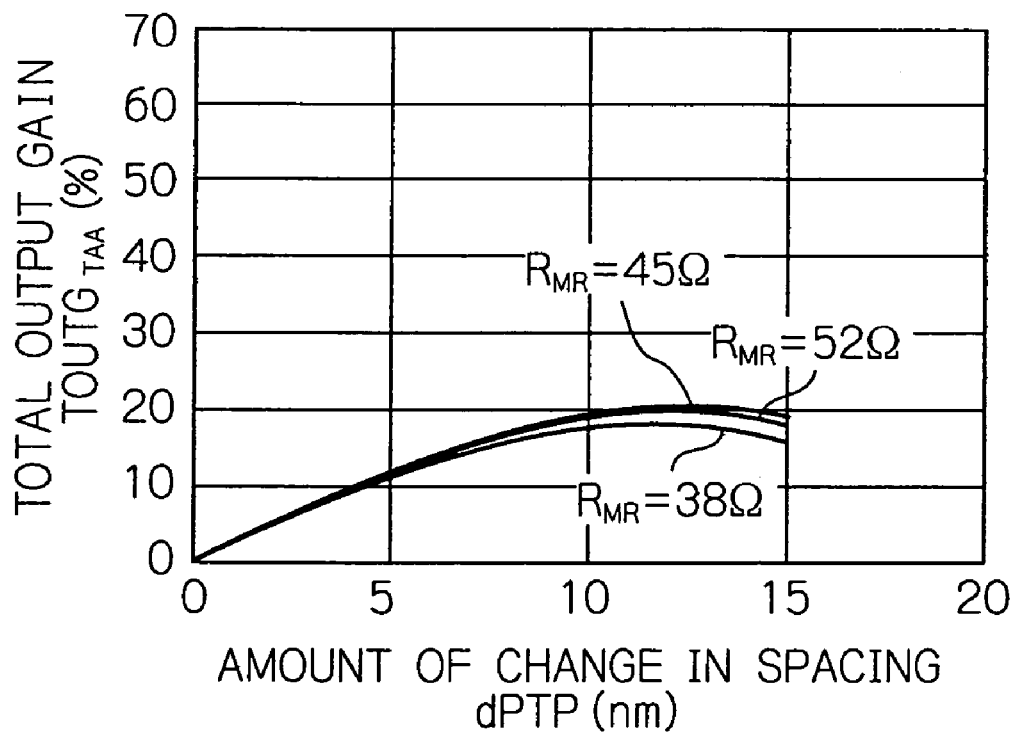
FIG. 16 shows a graph illustrating a relationship between the amount of change in spacing dPTP and the total output gain $TOUTG_{TAA}$.

FIG. 16 illustrates a relationship between the amount of change in spacing dPTP and the total output gain $TOUTG_{TAA}$. This figure indicates change in the total output gain $TOUTG_{TAA}$ for different element resistance values. It will be noted from the figure that the similar total output gain can be obtained in either case of $R_{MR}$=38 Ω and $R_{MR}$=52 Ω in comparison with the case of $R_{MR}$=45 Ω.

By designing and manufacturing a thin-film magnetic head with a heater 45 such that the spacing gain SG (nm/° C.) representing the change in spacing due to temperature increase of the MR read head element 42 becomes greater than the spacing gain threshold $SG_{THLD}$ (nm/° C.), effective magnetic spacing control and thus improvement of the output characteristic can be expected while suppressing the temperature increase of the MR read head element 42 to prevent shortening of lifetime and characteristic change due to possible stress change under high temperature. Furthermore, because the designing can be done conforming to this condition, extremely easy designing of the thin-film magnetic head can be attained.

In a modification of this embodiment, a heater 45' may be provided only in the rear side of the MR read head element 42 in relation to the PTR surface 44a, as shown in dotted line in FIG. 4. Also, although not shown, it is possible to provide a heater between the MR read head element 42 and the write head element 43, or in the rear side of the write head element 43 in relation to the PTR surface 44a. That is, a heater can be located in any position of the thin-film magnetic head. In further modification, a coil conductor of the write head element may also serve as a heater without providing an independent heater.

EXAMPLE 1

In case a thin-film magnetic head has the structure in which a heater 45 is formed at the position indicated by a solid line in FIG. 4, that is, at a position opposite the slider body 40 with respect to the MR read head element 42 and the inductive write head element 43, when a power of 100 mW is applied to this heater 45, an amount of change in spacing was dPTP=9.79 nm, a temperature increase value was dTEMP=10.5° C., Q=1.073° C./nm, and a spacing gain was SG=1/Q=0.932 nm/° C.

Table 1 shows the spacing gain thresholds $SG_{THLD}$ calculated from the aforementioned expression by changing the line recording density $LRD_{MF}$. It will be noted from this table that the aforementioned condition, i.e. the spacing gain SG being greater than spacing gain threshold $SG_{THLD}$ is satisfied.

TABLE 1

| Line Recording Density $LRD_{MF}$ (kFCI) | DPTP (nm) | Coefficient A | Coefficient B | Spacing Gain Threshold $SG_{THLD}$ (nm/° C.) |
|---|---|---|---|---|
| 300 | 10.0 | 0.0144 | 0.2688 | 0.412 |
| 400 | 10.0 | 0.0143 | 0.2191 | 0.362 |
| 500 | 10.0 | 0.0142 | 0.1787 | 0.320 |
| 600 | 10.0 | 0.0141 | 0.1457 | 0.286 |
| 700 | 10.0 | 0.0140 | 0.1187 | 0.258 |
| 800 | 10.0 | 0.0139 | 0.0968 | 0.236 |
| 900 | 10.0 | 0.0138 | 0.0789 | 0.217 |

EXAMPLE 2

In case a thin-film magnetic head has the structure in which a heater 45' is formed at the position indicated in a dotted line in FIG. 4, that is, in the rear side of the MR read element 42 in relation to the PTR surface 44a, when a power of 100 mW is applied to this heater 45', an amount of change in spacing was dPTP=6.71 nm, a temperature increase value was dTEMP=12.5° C., Q=1.863° C./nm, and a spacing gain was SG=1/Q=0.537 nm/° C.

The calculated spacing gains $SG_{THLD}$ are as shown in Table 1. It will be noted from this table that the aforementioned condition, i.e. the spacing gain SG being greater than spacing gain threshold $SG_{THLD}$ is also satisfied in this case.

Many widely different embodiments of the present invention may be constructed without departing from the spirit and scope of the present invention. It should be understood that the present invention is not limited to the specific embodiments described in the specification, except as defined in the appended claims.

The invention claimed is:
1. A thin-film magnetic head comprising:
at least one inductive write head element; and
at least one read magnetic head element,
said thin-film magnetic head being capable of controlling a spacing between a magnetic recording medium and said at least one magnetic read head element by heating,
a gain SG (nm/° C.) of the spacing being greater than a spacing gain threshold $SG_{THLD}$ (nm/° C.) defined by the following expression:

$SG_{LIMT} = A*dPTP+B$ $A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of said at least one inductive write head element and/or said at least one read magnetic head element by heating, and $LRD_{MF}$ represents a line recording density (kFCI) at a frequency half of the maximum recording frequency.

2. The thin-film magnetic head as claimed in claim 1, wherein said thin-film magnetic head further comprises an independent heating element other than a coil conductor of said at least one inductive write head element, and wherein said spacing is controlled by heating of said heating element.

3. The thin-film magnetic head as claimed in claim 1, wherein said spacing is controlled only by heating of a coil conductor of said at least one inductive write head element.

4. The thin-film magnetic head as claimed in claim 1, wherein said at least one read magnetic head element comprises a giant magnetoresistive effect read head element with a current in plane structure or a current perpendicular to plane structure, or a tunnel magnetoresistive effect read head element.

5. A head gimbal assembly comprising:
a thin-film magnetic head including at least one inductive write head element and at least one read magnetic head element, capable of controlling a spacing between a magnetic recording medium and said at least one magnetic read head element by heating; and
a support mechanism for supporting said thin-film magnetic head,
a gain SG (nm/° C.) of the spacing being greater than a spacing gain threshold $SG_{THLD}$ (nm/° C.) defined by the following expression:

$SG_{LIMT} = A*dPTP+B$ $A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of said at least one inductive write head element and/or said at least one read magnetic head element by heating, and $LRD_{MF}$ represents a line recording density (kFCI) at a frequency half of the maximum recording frequency.

6. The head gimbal assembly as claimed in claim 5, wherein said thin-film magnetic head further comprises an independent heating element other than a coil conductor of said at least one inductive write head element, and wherein said spacing is controlled by heating of said heating element.

7. The head gimbal assembly as claimed in claim 5, wherein said spacing is controlled only by heating of a coil conductor of said at least one inductive write head element of said thin-film magnetic head.

8. The head gimbal assembly as claimed in claim 5, wherein said at least one read magnetic head element of said thin-film magnetic head comprises a giant magnetoresistive effect read head element of a current in plane structure or a current perpendicular to plane structure, or a tunnel magnetoresistive effect read head element.

9. A magnetic disk drive apparatus comprising:
at least one head gimbal assembly provided with a thin-film magnetic head including at least one inductive write head element and at least one read magnetic head element, capable of controlling a spacing between a magnetic recording medium and said at least one magnetic read head element by heating, and a support mechanism for supporting said thin-film magnetic head,
a gain SG (nm/° C.) of the spacing being greater than a spacing gain threshold $SG_{THLD}$ (nm/° C.) defined by the following expression:

$SG_{LIMT} = A*dPTP+B$ $A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of said at least one inductive write head element and/or said at least one read magnetic head element by heating, and $LRD_{MF}$ represents a line recording density (kFCI) at a frequency half of the maximum recording frequency.

10. The disk drive apparatus as claimed in claim 9 wherein said thin-film magnetic head further comprises an independent heating element other than a coil conductor of said at least one inductive write head element, and wherein said spacing is controlled by heating of said heating element.

11. The disk drive apparatus as claimed in claim 9, wherein said spacing is controlled only by heating of a coil conductor of said at least one inductive write head element.

12. The disk drive apparatus as claimed in claim 9, wherein said at least one read magnetic head element of said thin-film magnetic head comprises a giant magnetoresistive effect read head element of a current in plane structure or a current perpendicular to plane structure, or a tunnel magnetoresistive effect read head element.

13. A method for designing a thin-film magnetic head including at least one inductive write head element and at least one read magnetic head element, a spacing between a magnetic recording medium and said at least one magnetic read head element being controllable by heating, said method comprising a step of determining a gain SG (nm/° C.) of the spacing to be greater than a spacing gain threshold $SG_{THLD}$ (nm/° C.) defined by the following expression:

$SG_{LIMT} = A*dPTP+B$ $A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of said at least one inductive write head element and/or said at least one read magnetic head element by heating, and $LRD_{MF}$ represents a line recording density (kFCI) at a frequency half of the maximum recording frequency.

14. A manufacturing method of a thin-film magnetic head including at least one inductive write head element and at least one read magnetic head element, a spacing between a magnetic recording medium and said at least one magnetic read head element being controllable by heating, said method comprising a step of determining a gain SG (nm/° C.) of the spacing to be greater than a spacing gain threshold $SG_{THLD}$ (nm/° C.) defined by the following expression:

$SG_{LIMT} = A*dPTP+B$ $A=1.4642E-02*\exp(-6.6769E-05*LRD_{MF})$
$B=4.9602E-01*\exp(-2.0423E-03*LRD_{MF})$ where dPTP represents an amount of change in protrusion (nm) of a top end of said at least one inductive write head element and/or said at least one read magnetic head element by heating, and $LRD_{MF}$ represents a line recording density (KFCI) at a frequency half of the maximum recording frequency.

* * * * *